UNITED STATES PATENT OFFICE.

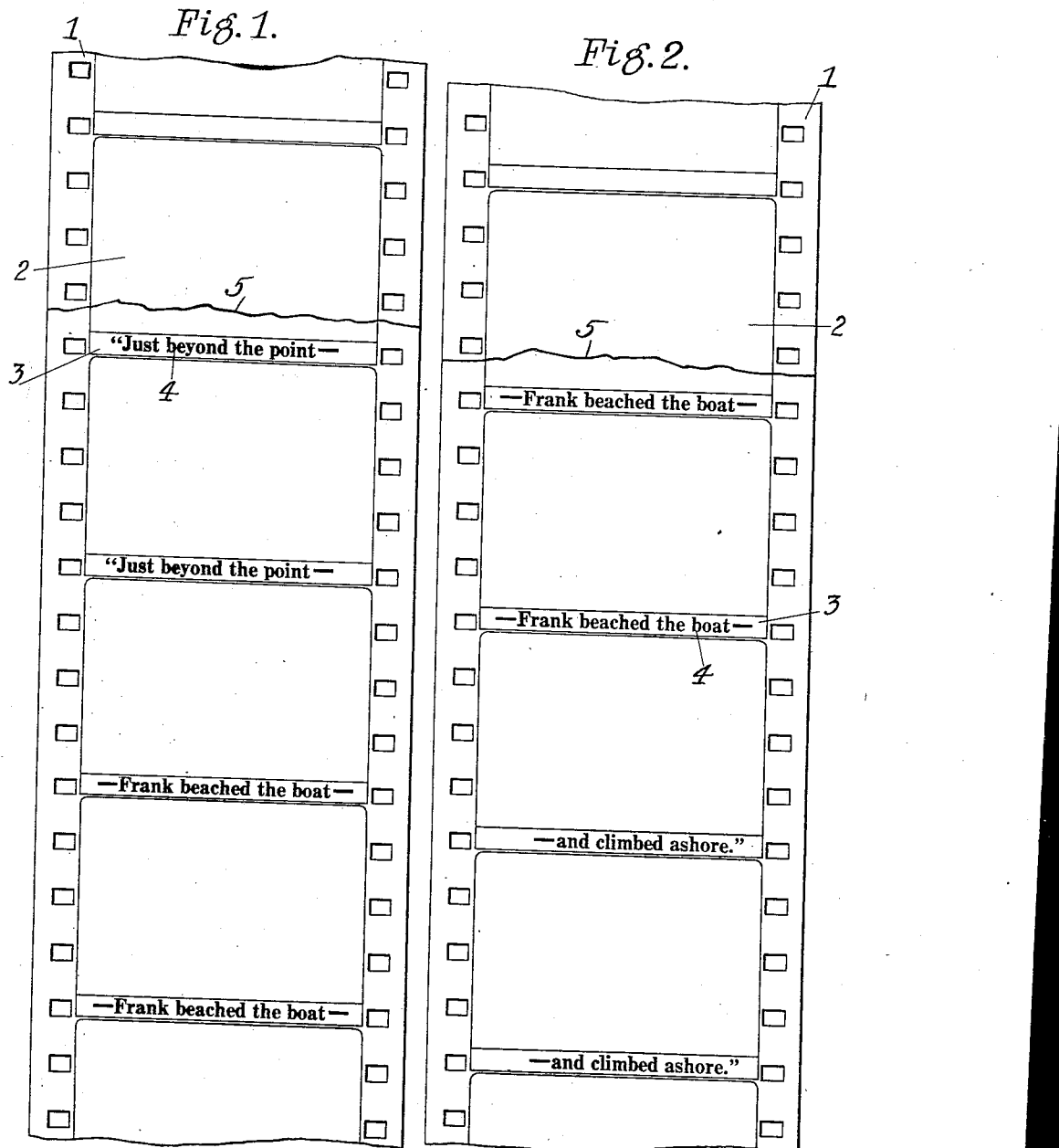

PETER J. LANDIN, OF DENVER, COLORADO.

MOTION-PICTURE FILM.

1,234,046.  Specification of Letters Patent.  Patented July 17, 1917.

Application filed February 6, 1914. Serial No. 817,021.

*To all whom it may concern:*

Be it known that I, PETER J. LANDIN, a citizen of the United States, residing at Denver, in the county of Denver and State of Colorado, have invented a new and useful Motion-Picture Film, of which the following is a specification.

The present invention relates to improvements in motion picture films, that is, more particularly to films used in connection with motion picture projector machines, one object of the present invention being the provision of dialogue or indicative legends carried upon the positive film adjacent each exposure thereof and for a sufficient number of times or successive reiterations to cover the period of the production of the respective scenes or parts of scenes, so that the dialogue or particular action presented may be coincidently explained in printing or otherwise, thus producing to a great degree a synchronous effect between the action of the images reproduced and the words spoken thereby.

In general practice, it has been found necessary to break in upon the successive reproduction of the exposures to indicate what is to follow, the dialogue generally being printed in quotations and thus interrupting to a great degree the proper reproduction in an intelligent manner so that the audience must, even when given an inkling of what is about to be said, guess at the words articulated by the actors. In the present instance, it is proposed to place at the bottom or in a convenient reading position upon each exposure of the positive film, a portion of the dialogue or words spoken by the actors or actor and to reiterate the same a sufficient number of times to give to the audience the exact spoken words simultaneously with the presentation of the picture in motion.

This may be done in many ways, a blank space being preferably left or made upon the positive film and the words being attached at the desired place upon the negative film so that when the positive film is printed therefrom, such words will be positively presented in the space upon the positive film and in connection with the necessary exposures thereof.

In the drawings—

Figures 1 and 2 are plan views of portions of a positive film constructed according to and embodying the present invention and showing the method of placing the monologue or dialogue words thereupon so as to produce the desired synchronous effect with the presentation of the scene.

Referring to the drawings, the numeral 1 designates the film, which is constructed as usual to carry a plurality of positive exposures 2, each one of which is provided as shown, with the horizontally disposed plain space 3 carrying the monologue or dialogue expression or words 4.

In the present instance, as shown in Fig. 1, three exposures are illustrated as acting the words "Just beyond the point" while in conjunction with Figs. 1 and 2, five exposures are employed to act the words "Frank beached the boat," while in Fig. 2 the two last exposures are shown as giving the proper words "and climbed ashore," thus clearly indicating the reiteration or successive projection of the legend necessary to tell to the audience with the projection of the scenes the action taking place, or the monologue or dialogue of the respective actor or actors.

The space carrying the legend portion may be dispensed with upon the record and the words may be produced upon any portion of the positive that is most convenient to be read without in any way necessitating the audience removing the eyes from the picture presented.

In the preferred form, beneath each of the respective exposures upon the negative film there should be placed a clear space extending across the film and wide enough to accommodate one line of exceedingly small type according to the size of the film employed. This clear space can be secured automatically by placing a mask within the camera and immediately in front of the lower portion or necessary space to be occupied by the sensitized film during exposure, the mask preventing the rays of light reaching the sensitized surface so that when the film is developed, a clear and transparent space will be provided to receive the lettering. Should the film be one which has not been made in a camera fitted with such a mask, the space beneath each exposure may be cleared with a knife or engraver's tool or by some other method so that the lettering consisting of the sentences, phrases or other single words where necessary may be placed within the spaces, preferably in black and sufficiently opaque, or may be produced upon exceedingly thin celluloid, gelatin, glass paper or any suitable transparent material which can be gummed or otherwise attached to the surface of the negative. The lettering thus printed upon the transparent strip or strips 5 is gummed or cemented to the film, the legends of the strip or strips being properly spaced to lie within the outlines of the spaces on the film. When the lettering of the negative film has been completed in this manner, the positive films used in the reproduction or projecting machines are then made by placing a sensitized film beneath the negative and exposing to the light in the usual way. The result will then be that the motion picture thrown upon the screen in the theater or auditorium, will have the lettering appear in white upon a dark field and at the lowermost portion of each exposure so that the audience may readily read the same. If so desired, the lettering may be applied in the above manner directly to the positive film in which case, the lettering would appear black upon a white ground.

The specific number of reiterations here shown are merely illustrative of the invention, it being necessary to place the same upon the film as the scenes and circumstances necessitate.

What is claimed is:

A motion picture film having a series of scenes and spaces individual to and associated with the same, in combination with a strip extending along the film and having legends corresponding with the particular scenes and spaced apart properly to lie within the outlines of said spaces of the film.

In testimony that I claim the foregoing as my own, I have hereto affixed my signature in the presence of two witnesses.

PETER J. LANDIN.

Witnesses:
J. G. STROHUBER,
B. A. INGRAM.